Oct. 7, 1958
A. J. GRANBERG
2,854,990
FLOW CONTROL VALVE ASSEMBLY RESPONSIVE
TO DOWNSTREAM PRESSURE
Filed Oct. 6, 1955
2 Sheets-Sheet 1
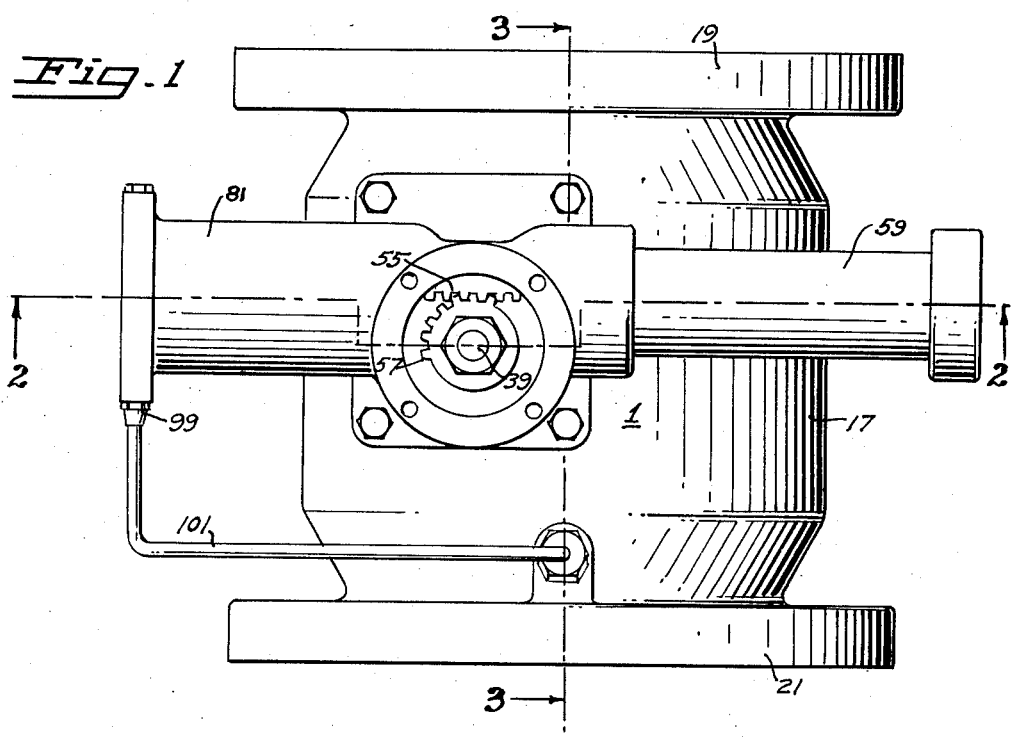
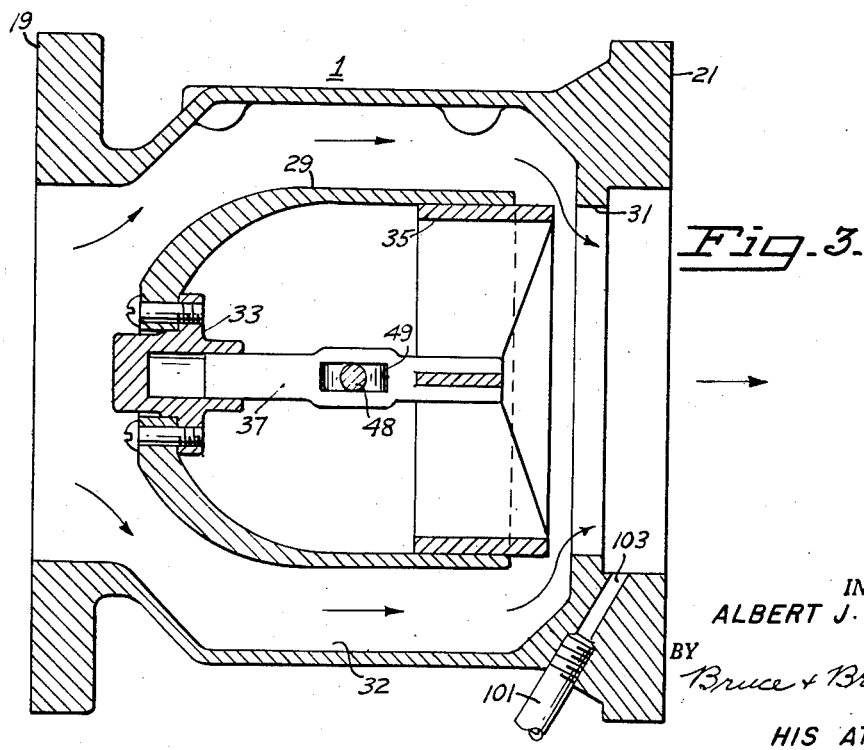
INVENTOR.
ALBERT J. GRANBERG
BY Bruce & Brosler
HIS ATTORNEYS

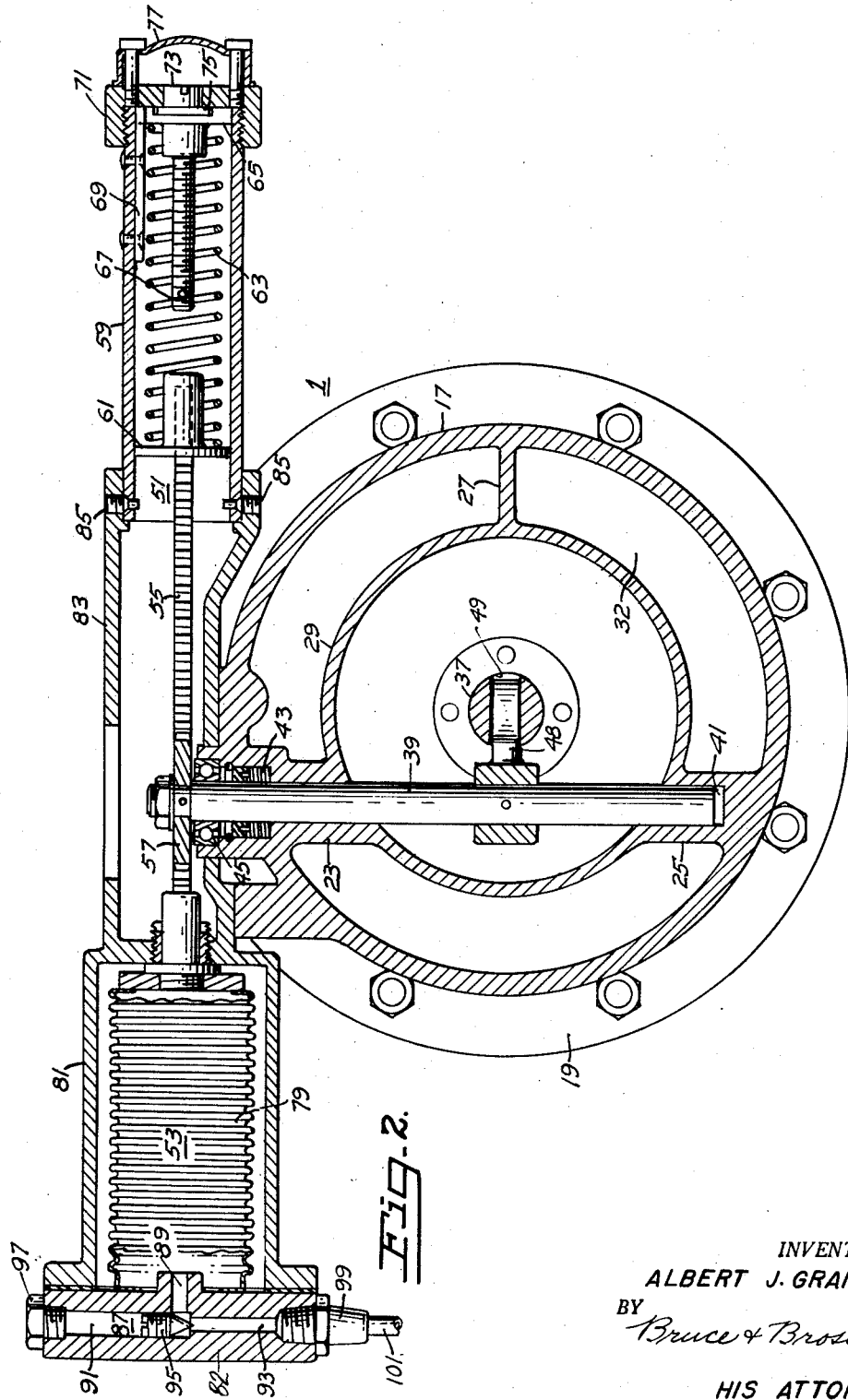

United States Patent Office 2,854,990
Patented Oct. 7, 1958

2,854,990

FLOW CONTROL VALVE ASSEMBLY RESPONSIVE TO DOWNSTREAM PRESSURE

Albert J. Granberg, Oakland, Calif.

Application October 6, 1955, Serial No. 538,933

2 Claims. (Cl. 137—220)

My invention relates to liquid flow valves and more particularly to a balanced flow control valve assembly.

Among the objects of my invention are:

(1) To provide a novel and improved flow control valve assembly.

(2) To provide a novel and improved flow control valve assembly which readily compensates for pressure variations in a flow line;

(3) To provide a novel and improved flow control valve assembly having a normal tendency to remain open;

(4) To provide a novel and improved flow control valve assembly which will function to permit gravity flow of liquid and without restriction;

(5) To provide a novel and improved flow control valve assembly which may be converted for operation in different ranges of pressure;

(6) To provide a novel and improved flow control valve assembly capable of smoothing out pulsations and transients which may originate in the system in which the valve assembly may be installed.

(7) To provide a novel and improved flow control valve assembly, in which the valve is balanced at all times.

Additional objects of my invention will be brought out in the following description of a preferred embodiment of the same taken in conjunction with the accompanying drawings, wherein Figure 1 is a plan view of the flow control valve assembly of the present invention, in its preferred form;

Figure 2 is a view in section taken in the plane 2—2 of Figure 1;

Figure 3 is a view taken in section, in the plane 3—3 of Figure 1.

Referring to the accompanying drawings for details of my invention in its preferred form, the invention contemplates a flow control valve assembly 1 intended for use primarily in a liquid dispensing system wherein liquid such as oil is pumped from a source of supply such as a storage tank, by means of a pump through a pipe line to a discharge hose connection which terminates in a suitable nozzle. The quantity of liquid discharged is measured by a liquid meter installed in the pipe line, and through which the liquid must flow on its way to the discharge end of the system. Meters for this purpose function most efficiently when the liquid is flowing therethrough at a certain prescribed rate, which may be measured in terms of so many gallons per minute.

The flow control valve assembly of the present invention is installed in the pipe line, and depending on its location in the line, is adjusted to set the flow rate of liquid through the line to fit the particular meter in the line. When once so adjusted, the valve assembly automatically functions thereafter to maintain such prescribed rate of flow, despite any changes in the system which might tend to alter the flow rate of the liquid therein.

The valve assembly involves an open ended casing 17 having a flange 19 at the intake end and a similar flange 21 at the other end, for connecting the assembly in the pipe line. Axially supported within the casing by lateral walls 23, 25, 27, is a valve chamber 29, preferably of dome shape and with the open end of an internal diameter of the order of that of the discharge opening 31 of the casing and terminating short of said discharge opening. The space between the valve chamber and the casing provides a flow passage 32 through the casing.

At its dome end, the valve chamber carries a blind end bushing 33.

Slidably receivable at the open end of the chamber is a cylindrical rim valve 35 having a valve stem 37 slidably receivable in the blind end bushing. The length of the valve is sufficient in one extreme position, to span the flow passage, whereby progressive throttling of the flow from open position of the valve may be realized.

Adjustments of the valve may be effected through angular rotation of a shaft 39 which traverses the valve chamber. At one end, this shaft is rotatably supported within a recess 41 formed in one of the lateral supporting walls, while at its other end it extends through a passage in another of such walls, to a point beyond the casing wall. The casing wall about the shaft is recessed to receive a gland 43 to protect against leakage from the chamber, and a ball bearing 45 to rotatably support this end of the shaft.

Within the valve chamber, a crank arm 48 is affixed to this shaft, with the free end of the crank arm of disc shape, loosely coupled to the valve stem 37 by extending into a slot 49 provided therein. Thus angular movement of the shaft will result in a shift of the valve in a direction and to an extent depending on the direction and degree of angular movement of the shaft.

By altering the positional adjustment of the valve in response to variations in pressure of liquid flowing through the passage, compensation may be effected to maintain the flow rate of the liquid substantially constant regardless of the tendency of the pressures in the system to fluctuate.

In adapting the valve assembly to compensate for pressure fluctuation, I provide means 51 for normally urging the valve toward its open position, and oppose this by pressure means 53 which is made responsive to variations in the pressure of the liquid in the system to the end that the position of the valve will be altered in a manner to immediately restore the flow rate to its desired value before it has had an opportunity to depart in any degree from such value.

The means for normally urging the valve toward its open position includes a rack 55 in engagement with a gear or pinion 57 mounted on the end of the shaft. This rack at one end, enters a tubular spring housing 59, where it terminates in a spring abutment 61.

Within the spring housing is a compression spring 63, at one end bearing against the spring abutment on the rack. At its opposite end, the spring bears against an adjusting nut 65 which is threadedly mounted on an adjusting screw 67 extending axially of the spring. The nut is precluded from rotational movement on the screw by slidably interlocking the same with a key 69 affixed to the inner surface of the spring housing and running longitudinally thereof.

The end of the spring housing is closed off by a cap 71 having a central hole therethrough to receive the head 73 of the adjusting screw, which is precluded from being withdrawn through the cap by a flange 75 nesting in a recess formed in the nut, and bearing against the inner surface of the cap.

It will be apparent from the foregoing, that the compression spring may readily be adjusted by rotating the adjusting screw with a screwdriver. This in turn will effect a corresponding change in the position of the valve within the valve assembly.

To discourage unauthorized tampering with the adjustment, once it is made, a protective cap 77 may be bolted to the spring housing cap, to seal from view, the exposed head of the adjusting screw.

Involved in the pressure responsive means which opposes the spring pressure against the rack, is a Sylphon bellows 79 coupled to the opposite end of the rack and exposed to the pressure of the liquid in the system.

Such Sylphon bellows is encased in a housing 81 closed at one end by a cap 82, and having an extension 83 which extends across and is affixed to the valve assembly casing, to provide an enclosure for the rack and a means for supporting the tubular spring housing 59, which fits into the remote end of the extension and is retained therein by a pair of diametrically disposed screws 85 of the set screw type. These screws are sufficiently long to pass through the wall of the spring housing where they function as stops to limit the maximum permissible expansion of the compression spring, and accordingly the maximum open position of the valve.

The cap 82 has a through passage 87 formed diametrically thereof and which is connected by a short lateral passage 89 leading into the Sylphon bellows. This through passage is in two sections, section 91 of one diameter and section 93 of smaller diameter, the larger diameter section being threaded to receive a tapered adjusting screw 95 to permit adjustment of the flow capacity of the smaller diameter section of the passage.

The exposed end of the larger diameter section of the passage is closed by a plug 97 while the exposed end of the smaller diameter portion is counterbored and threaded for the reception of a pipe fitting 99. From this point, a tube 101 is connected to an opening 103 in the casing of the valve assembly located at a point adjacent the flange 21 at the discharge end of the casing. This tube connection puts the Sylphon bellows in pressure responsive relationship to the pressure condition existing at the discharge end of the control valve assembly.

Thus any change in the pressure of the liquid flowing through the casing will produce a corresponding change in the Sylphon bellows, which in turn will cause a shift of the rack and a corresponding angular turning of the shaft. This in turn will bring about a shift in the position of the valve to promptly bring the flow rate back to normal.

In setting up a system for operation, flow of liquid is established by operation of the pump and while the liquid is flowing, adjustments of the spring are made until the proper rate of flow of liquid through the system is realized. Under the conditions thereby established, the Sylphon bellows and the compression spring are in balance with a certain pressure at the discharge end of the valve assembly. The valve control assembly will thereafter function to maintain a substantially constant flow rate in the system despite any tendency for fluctuations to occur in the system, on the input side of the valve assembly such as may be due to erratic operation of the pump.

Should the adjustment range of the existing spring be insufficient to encompass the pressure required in the system to establish the proper flow rate, it will be apparent that the spring may readily be replaced with one of a different calibration which will meet the requirements of the system.

Pulsations or throbbing often found in pipe lines caused by plunger type pumps or other type pump peculiarities, can be eliminated through adjustment of the tapered screw located in the cap of the Sylphon bellows housing. Further, when properly adjusted, there can be no slamming of the valve which might otherwise create a shock in the line.

It will be apparent from the fact that the valve is normally urged toward its open position by the spring, that the valve will be substantially fully open under conditions of gravity flow. Thus no interference in the operation of such system will be encountered under conditions where the liquid flow is due solely to gravity. This is a decided advantage in a system of the type under consideration.

Of significance in the present invention, is the fact that the valve, in the direction of its movement, is exposed to a balanced pressure, for the pressure at all times on one side of the valve will be the same as that on the other side, that is, in the direction of its movement. Thus, the valve being always balanced, will stay put at any position to which it may be adjusted, without requiring the application of a continuous force to hold the valve in such position. This characteristic also means that the force required to shift the valve from one position to another, will always be at a minimum, and well within the range of conventional and standard compression springs.

In installations where very delicate adjustments may be required to take care of minor variations in pressure in a line, longer and more sensitive springs might be required. The control valve assembly of the present invention lends itself very conveniently to such change over, merely by removing the complete spring assembly including its tubular housing, from the control valve assembly, and replacing it with a longer housing and longer spring.

From the foregoing description of my invention in its preferred form, it will be apparent that the same fulfills all the objects of the present invention, and while I have disclosed my invention in considerable detail, the same is subject to alteration and modification without departing from the underlying principles involved, and I accordingly do not desire to be limited in my protection to such details as I have illustrated and described, except as may be necessitated by the appended claims.

I claim:

1. Flow control valve assembly for use in a pipe line to maintain a substantially constant flow rate of liquid in such line, said flow control valve assembly comprising an open ended casing permitting liquid flow therethrough; valve means in said casing adapted to progressively throttle such flow from an open condition of said valve means, said valve means including a dome shaped valve chamber axially supported in said casing, a valve slidably fitting said chamber, said valve being of a length sufficient in one position to substantially span the passage created between said valve chamber and casing, a shaft extending into said valve chamber and operatively coupled to said valve; means normally urging said valve toward its open position, said means including a rack, a gear on said shaft in engagement with said rack, a spring assembly bearing on said rack and urging the same in the direction of opening of said valve, and stop means determining the maximum open position of said valve; and means included in and responsive to variation in pressure of liquid on the discharge side of said flow control valve assembly when connected in such pipe line, for altering the load on said spring to compensate for such variation and restore the predetermined flow rate in such line.

2. Flow control valve assembly for use in a pipe line to maintain a substantially constant flow rate of liquid in such line, said flow control valve assembly comprising an open ended casing permitting liquid flow therethrough; valve means in said casing adapted to progressively throttle such flow from an open condition of said valve means, said valve means including a dome shaped valve chamber axially supported in said casing and having at its closed end, a blind bushing, a valve slidably fitting said chamber and having a valve stem slidably supported in said bushing, said valve being of a length sufficient in one position to substantially span the passage created between said valve chamber and casing, a shaft extending into said valve chamber and rotatably supported in said casing, a crank arm fixed to said shaft and loosely coupled to said valve stem; means normally urging said valve toward its open position, said means including a rack, a gear on said shaft in engagement with said rack, a spring assembly bearing on said rack and urging the same in the direction of opening of said valve, and stop means determining the maximum open position of said valve; and means included in and responsive to variation in pressure of liquid on the discharge side of said flow control valve assembly when connected in such pipe line, for altering the load on said spring to compensate for such variation and restore the predetermined flow rate in such line, said last means including a Sylphon bellows mechanically coupled at one end to said rack, and a tube connected at one end to the discharge side of said valve casing and at its other end to said Sylphon bellows.

References Cited in the file of this patent

UNITED STATES PATENTS

| | | |
|---|---|---|
| 150,541 | Dinkel et al. | May 5, 1874 |
| 370,715 | Smith | Sept. 27, 1887 |
| 371,505 | Hyatt | Oct. 11, 1887 |
| 465,956 | Werner et al. | Dec. 29, 1891 |
| 993,921 | Walker | May 30, 1911 |
| 1,550,717 | Towle | Aug. 25, 1925 |
| 1,958,262 | Boland | May 8, 1934 |
| 2,316,052 | Dach | Apr. 6, 1943 |